No. 657,830. Patented Sept. 11, 1900.
A. PETZENBURGER.
CONDUCTOR AND COLLECTOR FOR ELECTRIC RAILWAYS.
(Application filed Dec. 8, 1899.)
(No Model.) 4 Sheets—Sheet 1.
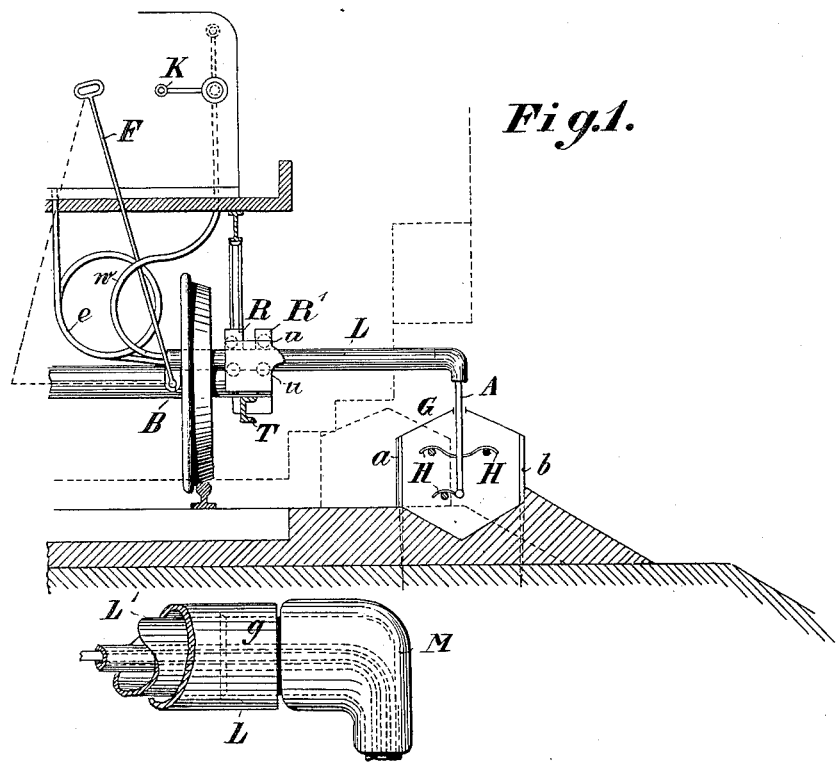
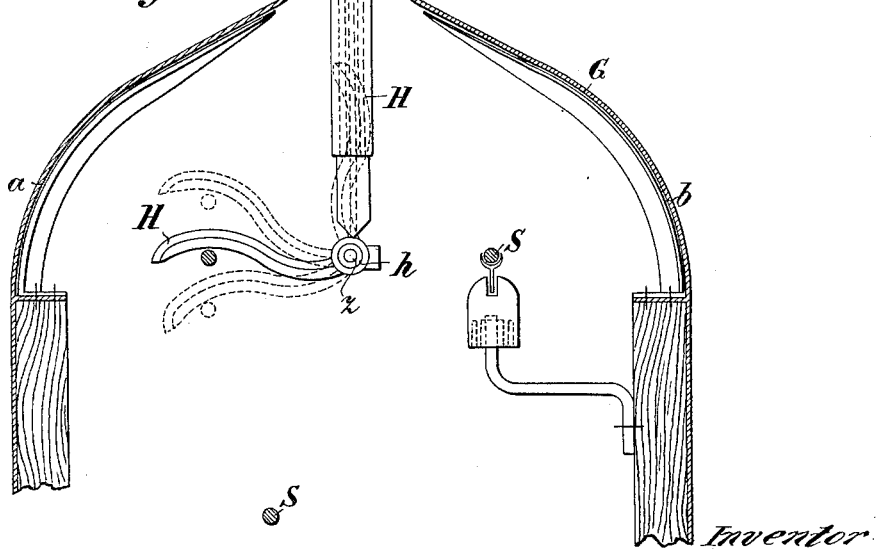

No. 657,830. Patented Sept. 11, 1900.
A. PETZENBÜRGER.
CONDUCTOR AND COLLECTOR FOR ELECTRIC RAILWAYS.
(Application filed Dec. 8, 1899.)
(No Model.) 4 Sheets—Sheet 2.
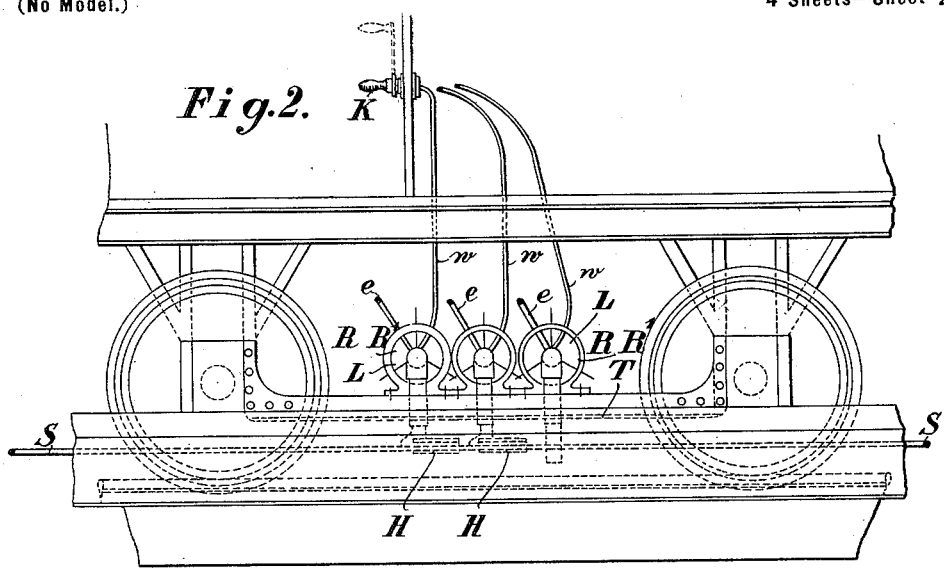
Fig. 2.
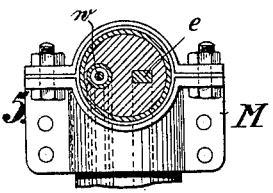
Fig. 6.
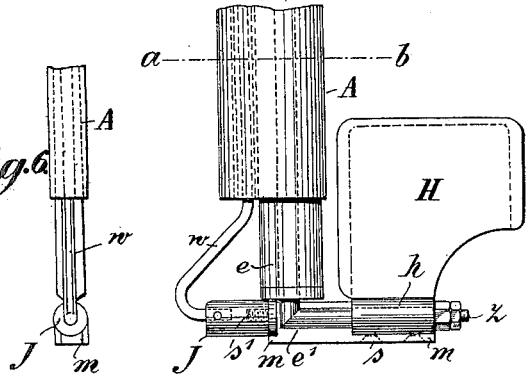
Fig. 5.
Fig. 7.
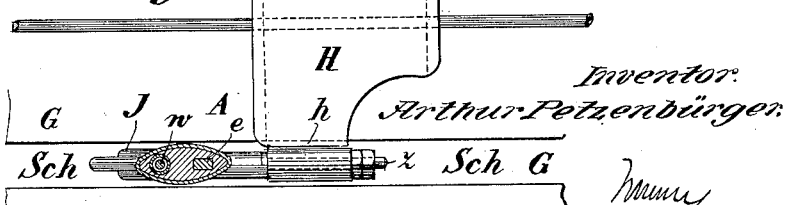
Fig. 8.
Inventor:
Arthur Petzenbürger.
By
Attorneys.
Witnesses:

No. 657,830. Patented Sept. 11, 1900.
A. PETZENBÜRGER.
CONDUCTOR AND COLLECTOR FOR ELECTRIC RAILWAYS.
(Application filed Dec. 8, 1899.)
(No Model.) 4 Sheets—Sheet 3.
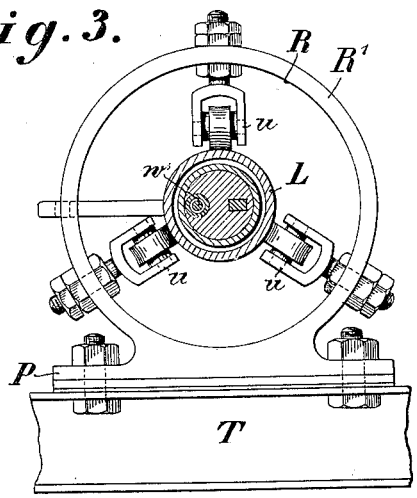
Fig. 3.
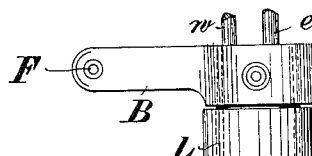
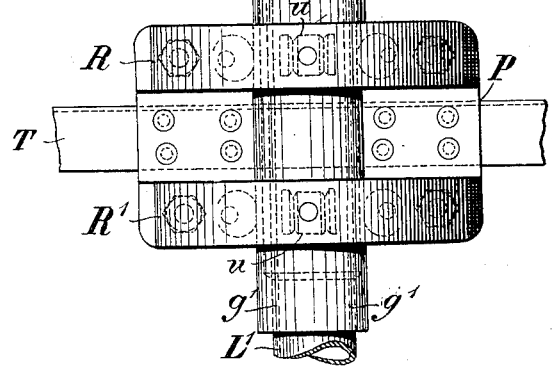
Fig. 9.
Inventor
Arthur Petzenbürger.
Witnesses.

No. 657,830. Patented Sept. 11, 1900.
A. PETZENBÜRGER.
CONDUCTOR AND COLLECTOR FOR ELECTRIC RAILWAYS.
(Application filed Dec. 8, 1899.)
(No Model.) 4 Sheets—Sheet 4.
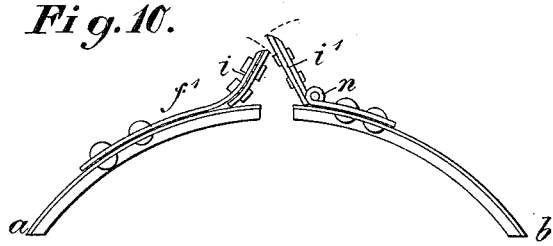
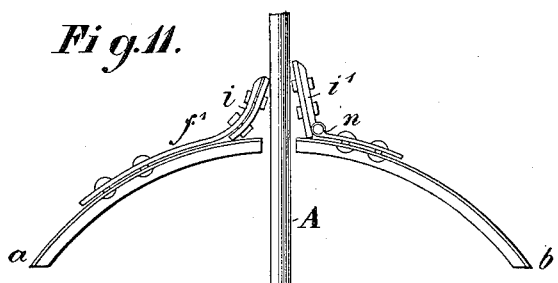
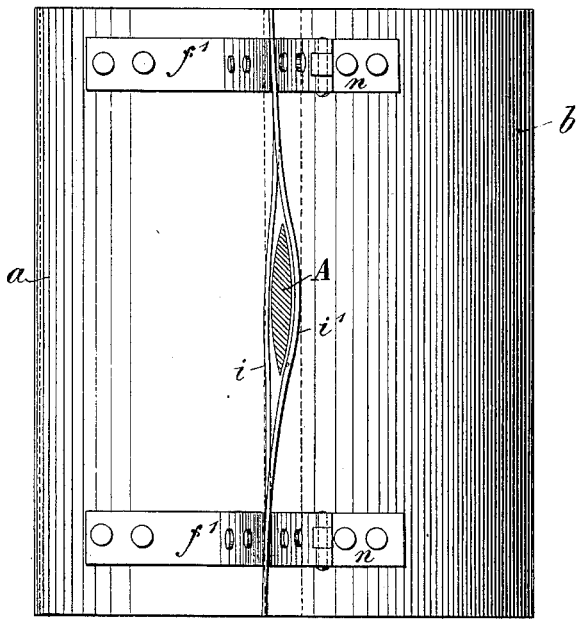
Inventor
Arthur Petzenbürger.
Witnesses:
By
Attorneys.

UNITED STATES PATENT OFFICE.

ARTHUR PETZENBÜRGER, OF BERLIN, GERMANY.

CONDUCTOR AND COLLECTOR FOR ELECTRIC RAILWAYS.

SPECIFICATION forming part of Letters Patent No. 657,830, dated September 11, 1900.

Application filed December 8, 1899. Serial No. 739,706. (No model.)

*To all whom it may concern:*

Be it known that I, ARTHUR PETZENBÜRGER, a subject of the King of Prussia, residing at Berlin, in the Kingdom of Prussia, Germany, have invented certain new and useful Improvements in Conductors and Collectors for Electric Railways, (for which I have applied for patents in Germany, dated September 4, 1899; in Austria, dated May 8, 1899; in Belgium, No. 142,573, dated May 10, 1899, and in England, No. 9,938, dated May 11, 1899,) of which the following is a specification.

A high electromotive force cannot be allowed by the authorities in the case of overhead or rail conductors because of the danger to which the passengers and staff would be subjected.

The object of this new construction is to remove this great disadvantage, which is especially felt on long lines.

On Sheet 1 of the accompanying drawings, Figures 1 and 2 represent the entire arrangement of my invention diagrammatically. Fig. 1 is a part section of the line, showing the protecting-case G, the conductors S, and the collector L at its extreme position. Fig. 2 is a front view of three current-collectors, arranged side by side, connected to the lower frame of the locomotive. Fig. 4 is a section of the protecting-casing G, revealing a side view of the current-collecting arm A and the contact-shoe H in several different positions. Figs. 5, 6, and 7 represent elevations of the arm A, the contact-shoe H in the inactive position, and the connection of the latter with the flexible shaft $w$ by the intermediate member $m\ m$. Fig. 8 is a section of the current-collector on line $a\ b$ of Fig. 5, showing a top view of the contact-shoe in the active position. Fig. 3 is a front view of the roller-guide K and K' and a section of the side arm L. Fig. 9 is a plan view of the roller-guide K K' and of the side arm L. On Sheet 2 of the drawings Figs. 10, 11, and 12 show a covering for the slot S$ch$.

My invention is characterized by the overground protecting-casing and the threefold-motion current-collector. The overground protecting-casing G, which is preferably arranged at the side of the rails, consists of the side parts $a$ and $b$, which have a slot at the top about four centimeters wide. These side protecting-strips, which can be constructed of various materials, are secured to posts rammed into the earth at suitable distances apart—as, for example, two meters—the said parts likewise serving for supporting the insulator-brackets of the conductors. With regard to the current-collector itself it should first be stated that each phase of the conductor has its own collector, each of which latter permits of a threefold motion and is adjustable. First, the contact-shoe H can be rotated on the pin Z through about one hundred and twenty degrees; secondly, the arm A of the side arm L L', which is perpendicular in the active position, can by rotation be moved into and out of the protecting-casing G, and, thirdly, the use of the protected low conductor necessitates a movement of the side arm L L' in a longitudinal direction to the extent of about one meter.

The contact-shoe H, which is formed from a corrugated copper plate, is provided with a boss or cylindrical part at the one edge, through which there is a hole $h$. The latter is ground on the pin Z, so that the current is transferred by the contact-shoe from the conductor to the pin Z with certainty, although the said contact-shoe can easily rotate on the pin. When the contact-shoe H has been placed on the pin Z, the insulating-body I is secured to the same with the help of the intermediate piece $m\ m$ and the screws $s\ s$ or $s'$, so that the three parts are united, can turn as one whole on the pin Z, and are supported together by the middle stronger part $e'$. To further secure the contact-shoe on the pin Z, a screw-thread is provided at the end of the pin.

In the insulating-body I the flexible shaft $w$ is secured. This shaft moves in a tube that passes through the side arm, and it issues below the locomotive, from whence it passes to the cab or driver's position, where it can be actuated by the lever K. The engine-driver is accordingly able to adjust the contact-shoe perpendicularly, as shown in dotted lines in Fig. 4, or to let it down onto the conductor. The contact-shoe bears on the conductor by reason of its own weight, which can be regulated accordingly.

The collector-arm A and the side arm L are rigidly connected by the elbow M. Through both the side arm L and the collector-arm A the copper conductor $e$, which terminates in the pin Z, and the flexible shaft $w$ pass, being insulated from each other and from the outer protecting and supporting tube. The outer casing of the collector-arm A is of steel of oval section and can therefore slide without hindrance in the slot $Sch$ of the casing G. Further, all obstructions that may arise from snow and ice can easily be overcome by the same. The envelop of the side arm L consists of a double tube. The inner tube L', which incloses the insulated conductor $e$ and flexible shaft $w$, is rotatably supported in the outer tube L by the rings $g$ $g'$, so that the engine-driver can by means of the rod F and lever B, which latter is secured to the tube L', rotate this said tube L', and thus also the arm A, moving the latter in or out of the protecting-casing G.

In Figs. 3 and 9 the roller-guide is represented. This guide supports the side arm L and permits of its movement in a longitudinal direction, so that the arm A, sliding in the slot, can adjust itself to the variations on the line between the casing G and the rails necessitated by constructional considerations. At the points of variation the protecting-casing G is strengthened, so that the collector may be safely guided by the slot. The roller-guide consists of two rings R and R', in each of which a number of rollers $u$ $u$ $u$ are secured with screw adjustment. By these rollers, which are screwed out to correspond with the circumference of the tube L, the side arm is guided in a longitudinal direction. The rings R and R' are screwed on a plate P, which is riveted to a beam secured between the bearings of two wheel-axles.

The flexible shaft $w$ will adapt itself to the movements of the side arm without difficulty, and the current-conductor $e$ is made with a few coils, so that it can likewise adjust itself without strain to the same movements. By means of the rod F the collector can be turned axially and also moved longitudinally, so that the engine-driver from his cab is able to turn the contact-shoe into and out of contact with the conductor, to turn the side arm at all distances of the protecting-casing from the rails, and to control the same in a longitudinal direction, (horizontally,) whereby the switching in and out of arm A is rendered possible.

The covering of the slot $Sch$, Figs. 10, 11, and 12, to be provided at stations, if necessary, consists of two elastic widths $i$ $i'$ of linoleum or the like, which are riveted to the protecting-casing at distances of fifty centimeters by springs $f'$ on the one side and hinges $n$ on the other. The arrangement is such that the elastic width only undergoes a slight lateral movement on the collector-arm passing, whereas the second width, which is attached by hinges and projects above the first, is turned back when the collector-arm passes through, being closed afterward by its own weight.

What I claim, and desire to secure by Letters Patent of the United States, is—

1. In an electric railway, a conductor-casing, having an elastic strip on each side of its slot, one strip being secured to the casing by springs and the other to the casing by a hinge, substantially as described.

2. In an electric railway, a conductor-casing having a strip of fabric extending along each side of its slot, and secured at intervals thereto, one strip being connected to the casing by a spring and the other by a hinge, substantially as described.

3. In an electric railway, a current-collector, comprising an angular rocking support having at the lower end of its vertical member a horizontal pivot projecting beyond the side of the same, a contact-shoe mounted to turn on said pivot, and means for swinging said shoe on its pivot, substantially as described.

4. In an electric railway, a current-collector, comprising an angular support mounted to rock and to have longitudinal movement, the vertical member of the support being provided with a horizontally-projecting pivot at its lower end, a contact-shoe mounted on the said pivot, and means passing through the support for operating the shoe, substantially as described.

5. In an electric railway, the combination with a support, of a pivoted contact-shoe carried by the support, and a flexible shaft for operating the shoe, and means for operating said shaft, substantially as described.

6. In an electric railway, the combination of a support mounted to a rock, pivoted contact-shoe carried by the support, a flexible shaft for operating the shoe, said shaft extending through the support to the operator's position, and means for rocking said support, substantially as described.

7. In an electric railway, the combination with a support, of a conductor extending through the support and having its lower end formed into a horizontally-projecting pivot, a contact-shoe mounted on the pivot, and means for swinging the shoe, substantially as described.

8. In an electric railway, the combination with a rocking support, of a conductor extending through the support and having its lower end formed into a horizontally-projecting pivot, a contact-shoe mounted on the pivot, and a flexible shaft for operating the shoe, said shaft passing through the support, substantially as described.

9. In an electric railway, the combination with a support mounted to rock and have longitudinal movement, of a conductor extending through the support and having one end formed into a coil and its other end into a pivot, and a contact-shoe mounted on the said pivot, substantially as described.

10. In an electric railway, the combination with a movable support, and contact-shoes carried thereby, of bearing-rings, and rollers carried by the rings and engaging the support for guiding it in its movement, substantially as described.

In testimony whereof I have hereunto set my hand in the presence of two witnesses.

ARTHUR PETZENBÜRGER.

Witnesses:
S. G. TRIPP,
WOLDEMAR HAUPT.